R. F. GOY.
AUTOMOBILE SLEIGH.
APPLICATION FILED JUNE 12, 1912.
1,084,207.
Patented Jan. 13, 1914.
2 SHEETS—SHEET 1.
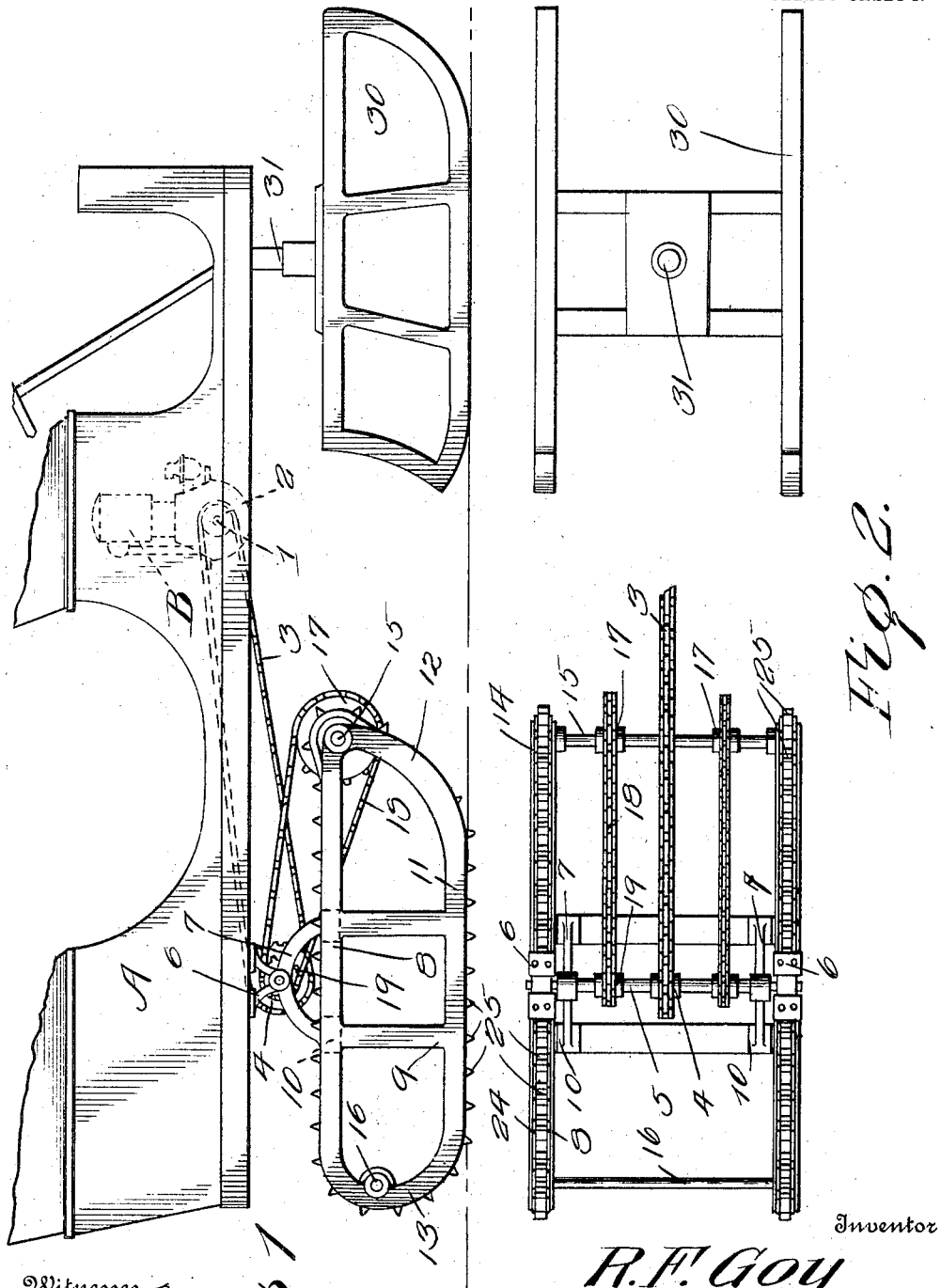
Inventor
R. F. Goy R. F. GOY.
AUTOMOBILE SLEIGH.
APPLICATION FILED JUNE 12, 1912.
1,084,207.
Patented Jan. 13, 1914.
2 SHEETS—SHEET 2.
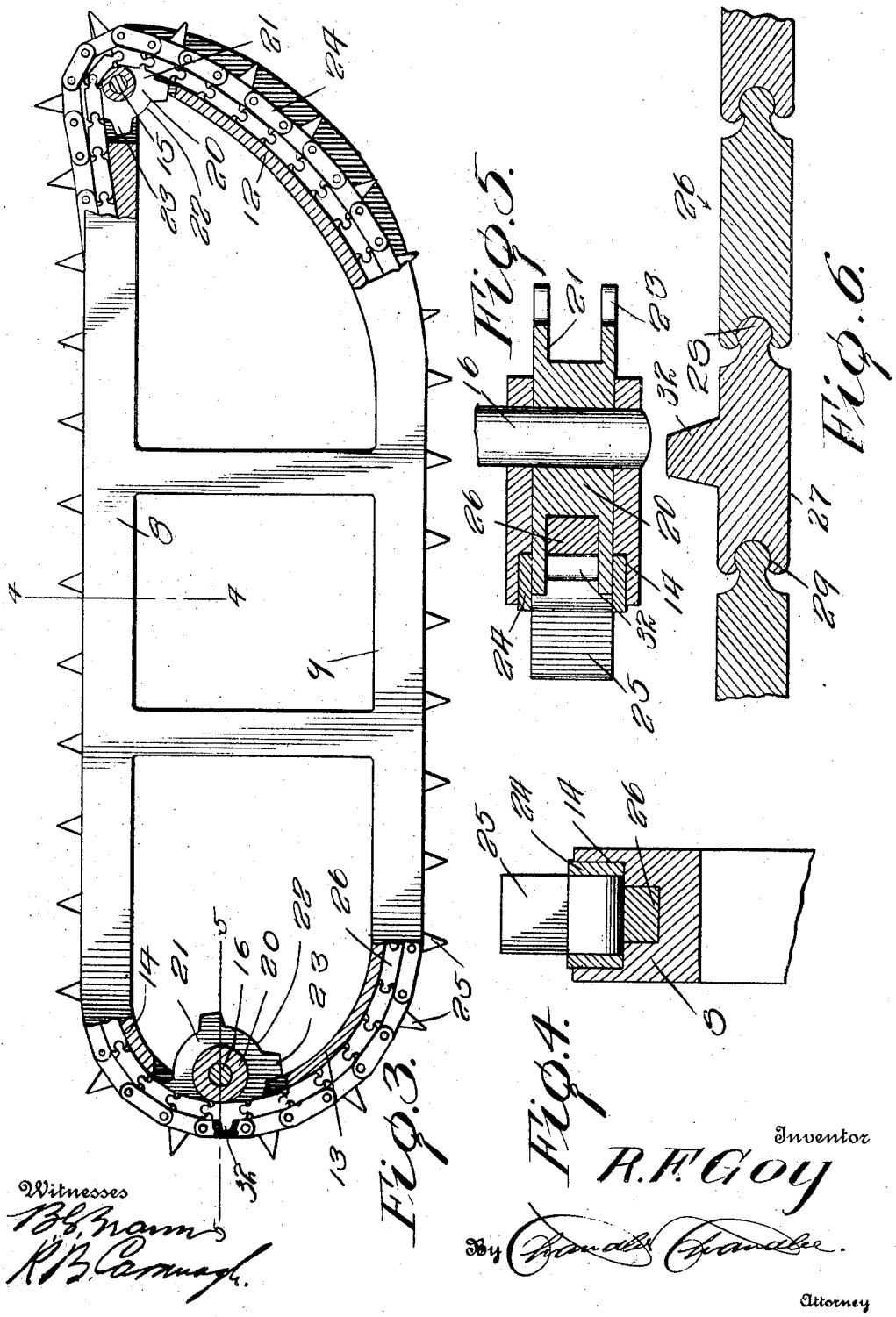

UNITED STATES PATENT OFFICE.

ROBERT F. GOY, OF FREEBURG, PENNSYLVANIA.

AUTOMOBILE-SLEIGH.

1,084,207.

Specification of Letters Patent.

Patented Jan. 13, 1914.

Application filed June 12, 1912. Serial No. 703,274.

*To all whom it may concern:*

Be it known that I, ROBERT F. GOY, a citizen of the United States, residing at Freeburg, in the county of Snyder, State of Pennsylvania, have invented certain new and useful Improvements in Automobile-Sleighs; and I do hereby declare the following to be a full, clear, and exact description of the invention, such as will enable others skilled in the art to which it appertains to make and use the same.

The present invention relates to certain novel and useful improvements in an automobile sleigh and has particular application to the traction or propelling mechanism.

In carrying out my invention it is my purpose to provide a sleigh with a simple, efficient and reliable form of traction or propelling mechanism designed to be driven by any preferred type of engine used as a hydro-carbon engine whereby the sleigh may be driven easily and readily.

Still a further object of my invention is to provide traction mechanism including an endless driving chain carrying ground engaging spurs, said chain in its travel passing over and moving in contact with a sliding chain whereby the friction is decreased, and a maximum traction effect obtained with a minimum expenditure of power.

I also aim to provide a structure which will embody the desired features of compactness and durability.

With the above recited objects and others of a similar nature in view, my invention consists in the construction, combination and arrangement of parts set forth and falling within the scope of the appended claim.

In the accompanying drawings like characters indicate like parts in all the views, and, Figure 1 a view in side elevation of a sleigh provided with my invention. Fig. 2 is a top plan view with the upper body of the sleigh removed. Fig. 3 is a longitudinal sectional view through one of the rear runners. Fig. 4 is a vertical cross sectional view taken on the line 4—4 of Fig. 3. Fig. 5 is a similar view taken on the line 5—5 of Fig. 3. Fig. 6 is a detail view of a portion of the sliding chain over which the driving chain moves.

Referring now to the accompanying drawings in detail, the letter A designates a sleigh body of any well known type, while B indicates an engine mounted thereon which may also be of any well known make. Carried by the engine shaft 1 is a sprocket 2 over which travels the endless power chain 3 which also passes in driving engagement over the sprocket 4 carried by the power shaft 5, the latter being mounted in brackets 6—6 connected to opposite sides of the frame of the sleigh. Each of these depending brackets 6 is connected to a curved arm or bow 7, the terminals of which are secured to the top-side 8 of the skeleton runner 9 at the points 10—10. The driving arrangement of the sleigh is in the present instance in the nature of a rear drive, that is to say is applied to the rear runners, and as each runner and its coöperating parts are similar in construction, a description of one rear runner will suffice for both. Each runner comprises a skeleton frame having the straight top-side 8, the lower ground bearing side 11 and the curved forward and rear ends 12 and 13 respectively. Each runner is formed with a groove or channel 14 extending entirely around the bottom, ends and top-side thereof, for a purpose hereinafter described.

Each rear runner is connected at its front and rear ends with the opposite runner by means of the cross shafts 15 and 16 respectively. The front shaft 15 is provided adjacent its ends with the sprockets 17—17 fast thereon and driven by the endless chains 18—18 which in turn run over and receive their driving motion from the sprockets 19—19 on the power shaft 5. Each of the shafts 15 and 16 carries fast at each end a sprocket wheel 20 having a chain-way or groove 21 extending circumferentially thereof, while the flanges 22 formed by the groove are provided with teeth 23 for engagement with the links of the traction chain 24. It will be seen by reference to Fig. 2 that I employ two traction chains, one for each runner, these being endless chains running over the front and rear sprockets 20 as will be readily understood. Each of the chains 24 is provided with outstanding ground engaging spurs 25 which are suitably spaced apart and are designed to penetrate or grip the snow or ice on the ground as the chains are driven and the vehicle propelled.

Riding or moving in the groove 14 in each runner is an endless chain 26 made up of a series of links 27, each link having a tongue 28 at one end and a socket 29 at the opposite end, the tongue of one link being designed to fit into the socket of the adjacent link as is clearly shown in Fig. 6. By such a construction, a smooth flexible endless chain is formed which as will be seen, slides in the groove or channel 14 of the runner and forms a carrier for the spur carrying traction chain. This sliding chain 26 in addition to running in the channel or groove 14, passes over the front and rear sprockets 20 of its runner, riding in the chain-way or groove 21 in each of the sprockets, so that while such chain receives motion from the sprockets, it is out of contact with and will not interfere with the driving or traction chain of the sprockets. It will be noted that the links 27 are solid links so that lubricant may be used between the links and the bottom of the groove and thereby lessen the friction, the links serving to keep snow from carrying off the lubricant as they cover the exposed surface. The sleigh is also provided with a pair of connected front runners 30—30 connected to the vertical shaft 31 and steered by any suitable steering mechanism, the front runners of course, being capable of being turned by the steering gear in any desired direction.

From the above description taken in connection with the accompanying drawings, the construction and operation of my improved automobile will be readily apparent. When the engine is started power is transmitted through the chain 3 to the sprocket 4 and thence to the power shaft 5, thus driving the chains 18—18 which in turn rotate the shaft 15 and consequently the sprocket at the end thereof. This causes the traction chains 24 to be driven and likewise imparts motion to the antifriction or sliding chain 26. It will be seen that the lower runs of the traction chains travel in contact with the sliding chains, while the upper runs of such traction chains travel above the sliding chains. The rear ends of both the front and rear runners are curved to such an extent that the same may be run backward as well as forward.

It will be noted that I have provided an exceedingly simple yet efficient form of automobile sleigh in which the friction on the traction chains is reduced to a minimum. If desired, the sliding chains may be kept lubricated to further reduce the friction. These sliding chains are also provided with small projections 32 which engage with the links of the traction chain so that the flexible chains are also driven and travel with the traction chain.

While I have herein shown and described one particular embodiment of my invention I wish it to be understood that I do not confine myself to all the precise details of construction herein set forth by way of illustration, as modification and variation may be made without departing from the spirit of the invention or exceeding the scope of the appended claim.

What I claim is:

In an automobile sleigh, the combination with the body portion, of front and rear runners therefor, each rear runner comprising top and bottom and curved front and rear portions, the outer edges of said runners being provided with a circumscribing channel, sliding chains traveling in the channels, each of these chains consisting of a connecting series of solid links covering the bottom of the respective channel whereby the lubricants disposed between the chain and channel bottom may be protected from snow, each chain having projections formed thereon, sprocket wheels at the ends of the runners, said sprocket wheels being provided on their peripheries with circumscribing grooves, forming roller bearings for the sliding chains, traction chains traveling over the sliding chains and over the sprockets and adapted to be engaged by the projections on the sliding chains, spurs carried by the traction chains, power mechanism for driving the sprocket wheels and the sides of the front portion of the runner extended past the spurs to form guards therefor.

In testimony whereof, I affix my signature, in presence of two witnesses.

ROBERT F. GOY.

Witnesses:
JACOB RANCH,
JOHN S. HENDRICKS.

---

Copies of this patent may be obtained for five cents each, by addressing the "Commissioner of Patents. Washington, D. C."